(12) United States Patent
Ohashi

(10) Patent No.: US 7,077,222 B2
(45) Date of Patent: *Jul. 18, 2006

(54) TRANSAXLE APPARATUS AND FOUR-WHEEL DRIVING WORKING VEHICLE USING THE APPARATUS

(76) Inventor: Ryota Ohashi, 2-18-1, Inadera, Amagasaki-ski, Hyogo (JP) 661-0981

( * ) Notice: Subject to any disclaimer, the term of this patent is extended or adjusted under 35 U.S.C. 154(b) by 0 days.

This patent is subject to a terminal disclaimer.

(21) Appl. No.: 11/101,492

(22) Filed: Apr. 8, 2005

(65) Prior Publication Data

US 2005/0173178 A1    Aug. 11, 2005

Related U.S. Application Data

(63) Continuation of application No. 10/282,038, filed on Oct. 29, 2002, now Pat. No. 6,902,017.

(51) Int. Cl.
*F16D 31/02* (2006.01)
(52) U.S. Cl. ............... 180/53.6; 180/233; 180/378; 60/445
(58) Field of Classification Search ........... 180/53.1, 180/53.4, 53.6, 53.62, 53.7, 242–245, 305–207, 180/378, 380, 233; 60/443–445, 487
See application file for complete search history.

(56) References Cited

U.S. PATENT DOCUMENTS

| 4,262,768 | A |  | 4/1981 | Itatani et al. |
| 5,067,933 | A |  | 11/1991 | Hardesty et al. |
| 5,542,307 | A |  | 8/1996 | Hasegawa et al. |
| 5,560,447 | A |  | 10/1996 | Ishi et al. |
| 6,098,738 | A |  | 8/2000 | White |
| 6,457,546 | B1 |  | 10/2002 | Ishimaru et al. |
| 6,553,759 | B1 |  | 4/2003 | Matsufuji |
| 6,845,837 | B1 | * | 1/2005 | Ohashi et al. .............. 180/235 |
| 6,902,017 | B1 | * | 6/2005 | Ohashi ....................... 180/53.6 |
| 6,926,111 | B1 | * | 8/2005 | Irikura ........................ 180/234 |
| 2005/0121246 | A1 | * | 6/2005 | Ohashi et al. .............. 180/242 |
| 2005/0211494 | A1 | * | 9/2005 | Okada et al. ............... 180/305 |

FOREIGN PATENT DOCUMENTS

| JP | 7-1976 | 1/1995 |
| JP | 2000-270651 | 10/2000 |

* cited by examiner

*Primary Examiner*—Lesley D. Morris
*Assistant Examiner*—Matthew Luby
(74) *Attorney, Agent, or Firm*—Sterne, Kessler, Goldstein & Fox P.L.L.C.

(57) ABSTRACT

An articulate vehicle has first and second frames, which are coupled to each other at proximal ends thereof with respect to the vehicle through a coupling part so as to be relatively rotatable around a vertical axis according to steering operation. The first and second frames are distributed at front and rear portions of the vehicle. The first frame supports a first transaxle apparatus having first axles, and the second frame supports a second transaxle apparatus having a pair of second axles. A gearbox is disposed near the coupling part and provided with a pair of mutually drivingly connected horizontal shafts which are variable in relative angles thereof around the vertical axis according to steering operation. One of the horizontal shafts is drivingly connected to a power take-off shaft for extracting output power of a speed-changing arrangement in the first transaxle apparatus. The other of the horizontal shafts is drivingly connected to an input shaft of the second transaxle apparatus. The vehicle is provided with a rotor having a rotary axis disposed on the vertical axis so as to output power from a prime mover to a working device.

2 Claims, 9 Drawing Sheets

TRANSAXLE APPARATUS AND FOUR-WHEEL DRIVING WORKING VEHICLE USING THE APPARATUS

BACKGROUND OF THE INVENTION

1. Field of the Invention

The invention relates to a structure of an articulate vehicle, such as a riding lawn mower, comprising two mutually pivotally connected front and rear frames equipped with respective transaxle apparatuses supporting axles with wheels mounted thereon. More particularly, it relates to a structure for transmitting driving force to the transaxle apparatuses of both the frames from a prime mover, a structure for transmitting driving force from the prime mover to a working device attached to one of the frames, and a structure with a coupling part of the front and rear frames.

2. Related Art

Conventionally, there is a well-known articulate riding lawn mower having mutually pivotally connected first and second frames so as to enable the first frame to turn relative to the second frame. The first frame is disposed at one of front and rear portions of the vehicle and equipped with a prime mover and a transaxle apparatus which supports axles driven by power from the prime mover. On the other hand, the second frame is disposed at the other of the front and rear portions of the vehicle and equipped with a working device (such as a mower device), an operating section, and an axle casing that supports freely rotatable axles.

Japanese Patent Laid Open Gazette 2000-270651 discloses an articulate four-wheeled lawn mower, which comprises the first frame as a rear frame and the second frame as a front frame. On the rear frame is disposed an HST (a hydrostatic transmission), which transmits engine power to rear wheels supported on the rear frame. Moreover, in the rear frame is disposed a power take-off shaft which takes out power from a pump shaft of a hydraulic pump of the HST which rotates synchronously to the engine power output rotation. The rotation of the pump shaft is transmitted to a mower device supported by the front frame.

Generally, as to each of the vehicles having the above structure, while the axles supported by the transaxle apparatus of the first frame usually serving as a rear frame is driven by the prime mover, the axles supported by the axle casing of the second frame usually serving as a front frame rotate freely in no association with the power for driving the axles of the first frame. Thus, the vehicle is of the so-called two-wheel (rear-wheel) drive type.

However, the two-wheel drive vehicle which drives only rear wheels is inferior in its gradablility when working on a slope and roadability when running on a bad road. There arise some problems such that the vehicle, when being in mud etc., is hard to bail out. For solving the problems, the articulate vehicle is desired to become a four-wheel drive vehicle, which drives both its front and rear wheels.

The rear frame of the vehicle disclosed in the document is provided with the HST and the power take-off shaft for taking out power for the working device. However, as mentioned above, the power take-off shaft rotates synchronously with rotation of the pump shaft, which is fixed in speed as long as engine speed is fixed. On the other hand, the rotary speed of the rear wheels, which are driven by power output of the hydraulic motor, is variable according to running-speed-changing operation for adjusting the angle of a movable swash plate of the hydraulic pump. Therefore, the power take-off shaft for driving the working device cannot be used as a front wheel drive shaft as it is.

Moreover, even if the power for driving the front wheels can be transmitted to the front frame from the rear frame so as to rotate the front wheels synchronously to the rotation of the rear wheels, the lawn mower disclosed in the document also requires means to transmit the power of the prime mover carried in the rear frame to the working device provided on the front frame. For this reason, existence of the coupling part between the rear frame and the front frame complicates the configuration of the power transmitting system of these two trains.

SUMMARY OF THE INVENTION

A first object of the present invention is to provide a transaxle apparatus for making an articulate vehicle equipped with the transaxle apparatus into a four-wheel drive articulate vehicle.

To achieve the first object, the transaxle apparatus according to the present invention comprises a housing. In the housing is disposed an HST comprising a hydraulic pump, which receives prime mover power, and a hydraulic motor driven in response to fluid from the hydraulic pump. The axle is installed in the housing so as to extend toward the outside from the inner side of the housing. A drive train drivingly connecting the hydraulic motor to the axle is disposed in the housing. Moreover, in the housing, a power take-off shaft drivingly connected with the drive train is disposed perpendicularly to the rotary axis of the hydraulic motor.

Since the power take-off shaft in the transaxle apparatus of the invention rotates with the power of the drive train which transmits the power output of the hydraulic motor of the HST in the housing to the axle supported in the housing, the rotary speed of the power take-off shaft varies synchronously with variation of the power output rate of the hydraulic motor. Thus, the axle driven with the power take-off shaft can be rotated synchronously with the axle supported in the housing so as to enable the vehicle to drive its four wheels.

Especially in order to apply such a transaxle apparatus to a vehicle like a lawn mower carrying a vertical crankshaft engine, an input shaft of the hydraulic pump is disposed vertically, the rotary axis of the hydraulic motor is disposed in parallel to the axle, and the power take-off shaft is disposed horizontally perpendicularly to the axle.

In an articulate vehicle having the coupling part for coupling the front and rear frames mutually relatively rotatably as mentioned above, a drive shaft for interlockingly connecting the front and rear transaxle apparatuses mutually must be disposed so as to avoid interfering with the coupling part.

Therefore, according to the above transaxle apparatus of the invention, a first level surface on which an axis of the power take-off shaft is laid is disposed higher than a second level surface on which an axis of the axle is laid, so as to ensure a high road clearance.

For arranging novel power transmitting means in the transaxle apparatus, it is necessary to improve the assembly of the transaxle apparatus.

Therefore, according to the present invention, the housing of the transaxle apparatus which arranges the power transmitting means therein is constituted by two housing components separably joined to each other through the first level surface, thereby improving the workability in assembling the transaxle apparatus.

Furthermore, if the articulate vehicle enabled to drive with four wheels has a working device attached onto the frame other than the frame on which the prime mover is mounted, it also becomes necessary to provide other means for transmitting power from the prime mover to the working device. A second object of the present invention is to provide an articulate vehicle in which a power train for four-wheel driving and a power train for driving the working device are compactly interposed between the front and rear transaxle apparatuses while they are prevented from interfering with each other.

To achieve the second object, according to the vehicle of the present invention, a proximal end of a first frame disposed on one of front and rear portions of the vehicle is pivotally connected to a proximal end of a second frame disposed on the other of the front and rear portions of the vehicle through a coupling part having a vertical axis so that the first and second frames can be turned relatively to each other around the vertical axis by steering operation. In the vicinity of the coupling part is disposed a gearbox provided with a pair of horizontal shafts drivingly connected to each other variably in their relative angles around the vertical axis. While a prime mover is carried on the first frame, a working device is supported by the second frame, and the working device is positioned on an end portion of the second frame opposite to its side confronting the first frame. A rotor whose rotary axis is disposed on the vertical axis serves as means to output the power from the prime mover to the working device. The first transaxle apparatus is provided with a first input shaft, a speed-changing arrangement, and a power take-off shaft. The first input shaft receives power from the prime mover. The speed-changing arrangement changes the speed of rotation transmitted from the first input shaft and outputs the power for driving a pair of the first axles. The power take-off shaft extracts rotation synchronized with the pair of first axles and is drivingly connected to one of the pair of horizontal shafts in the gearbox. On the second transaxle apparatus side, one of a pair of second axles is longer than the other. A transmission element for connecting the rotor to the working device drivingly crosses one of the second axles, preferably, the longer second axle. Furthermore, the second transaxle apparatus is provided with a second input shaft which is drivingly connected to the other of the pair of horizontal shafts so as to be drivingly connected to the first axles supported by the first transaxle apparatus.

Accordingly, in the vicinity of the coupling part which connects the first and second frames is disposed the gear box having the pair of horizontal axles for connecting the power take-off shaft of the first transaxle apparatus to the second input shaft of the second transaxle apparatus. The vertical axis serving as a rotary axis of the horizontal shafts also serves as a rotary axis of the rotor, and the rotor serves as means for outputting power from the prime mover carried in the first frame to the working device with which the second frame is loaded. Therefore, the power transmission system for four-wheel drive interposed between both the front and rear transaxle apparatuses and the power transmission system for driving the working device intersect each other near the coupling part of vehicle, while they are prevented from interfering with each other. Consequently, a four-wheel drive articulate vehicle enabled to be equipped with a working device is realized.

BRIEF DESCRIPTION OF THE FIGURES/DRAWINGS

DETAILED DESCRIPTION OF THE PREFERRED EMBODIMENT

Figure 1:
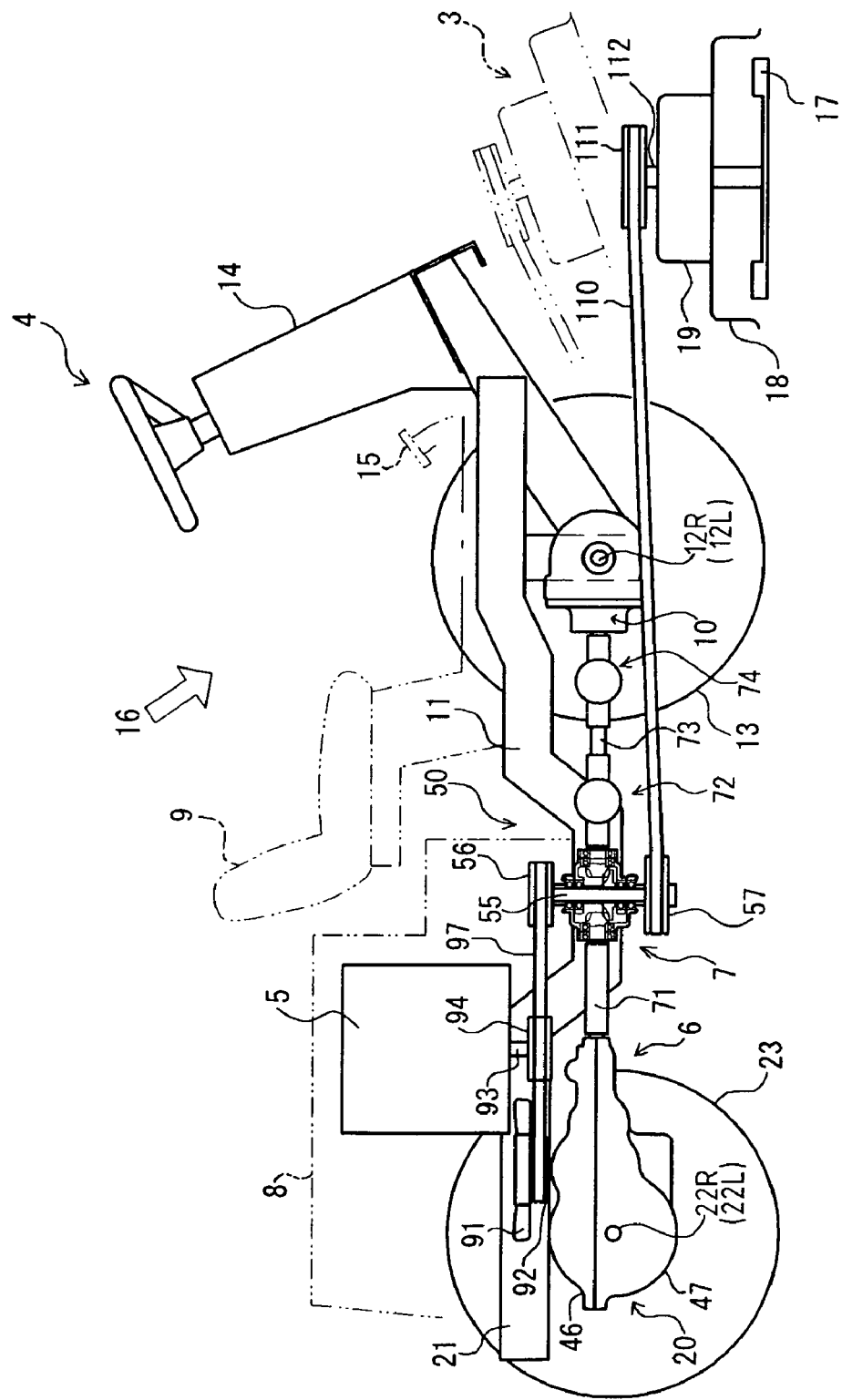
FIG. 1 is a side view of a lawn mower as one embodiment of an articulate vehicle according to the invention.

A working vehicle shown in FIG. 1 is a lawn mower provided at a front portion thereof with a mower device 3 serving as a working device. A first transaxle apparatus 20 is arranged on a rear frame 21 serving as a first frame. Left and right rear wheel axles 22L and 22R are extended laterally from the first transaxle apparatus 20 and fixedly provided thereon with respective rear wheels 23. On the other hand, a second transaxle apparatus 10 is arranged on a front frame 11 serving as a second frame. Left and right front wheel axles 12L and 12R are extended laterally from the second transaxle apparatus 10 and fixedly provided thereon with respective front wheels 13.

A rear end portion of the front frame 11 and a front end portion of the rear frame 21 are mutually connected horizontally rotatably at a pivotal coupling part 50 so as to enable the front frame 11 to turn laterally relative to the rear frame 21, thereby making the vehicle into a so-called articulate vehicle.

On a front portion of the front frame 11 are arranged a steering column 14, a steering wheel 4, a foot pedal 15, and behind the steering column 14 is disposed a seat 9, thereby constituting an operation part 16 on the front frame 11. A mower device 3 is vertically movably disposed downwardly forward from the operation part 16.

On the rear frame 21 is disposed an engine 5 covered with a bonnet 8. A first transaxle apparatus 20 is arranged under the engine 5.

The first transaxle apparatus 20 has laterally extended left and right rear wheel axles 22L and 22R and transmits power of the engine 5 to the rear wheel axle 22L and 22R so as to drive the rear wheels 23. Also, the first transaxle apparatus 20 juts out a power take-off part 6 forward and transmits power taken out from the power take-off part 6 to the second transaxle apparatus 10 through power transmission system 7 so as to drive the front wheels 13 fixed on the left and right front wheel axles 12L and 12R extended laterally from the second transaxle apparatus 10.

Figure 2:
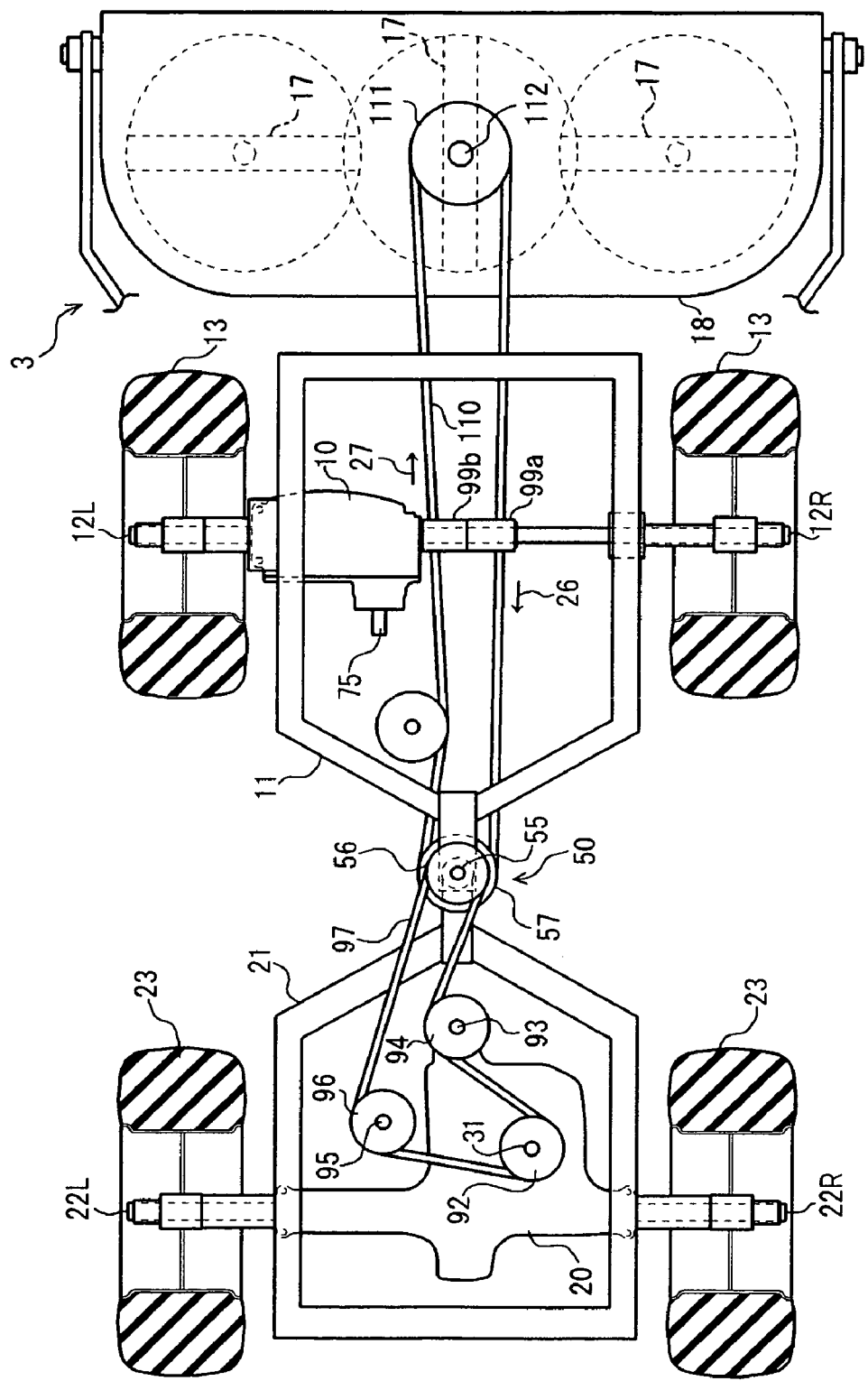
FIG. 2 is a plan view of a structure of power transmission means for driving a working device provided in the lawn mower.

As shown in FIG. 2, a hydraulic pump is disposed in the first transaxle apparatus 20, and a pump shaft 31 of the hydraulic pump projects vertically upward from the first transaxle apparatus 20 so as to be fittingly provided thereon with an HST input pulley 92. An output shaft 93 projects vertically downward from the engine 5, and an engine output pulley 94 is fitted on the output shaft 93. A support shaft 95 projects downward from the rear frame 21, and an idle roller 96 is rotatably fitted onto it.

Figure 4:
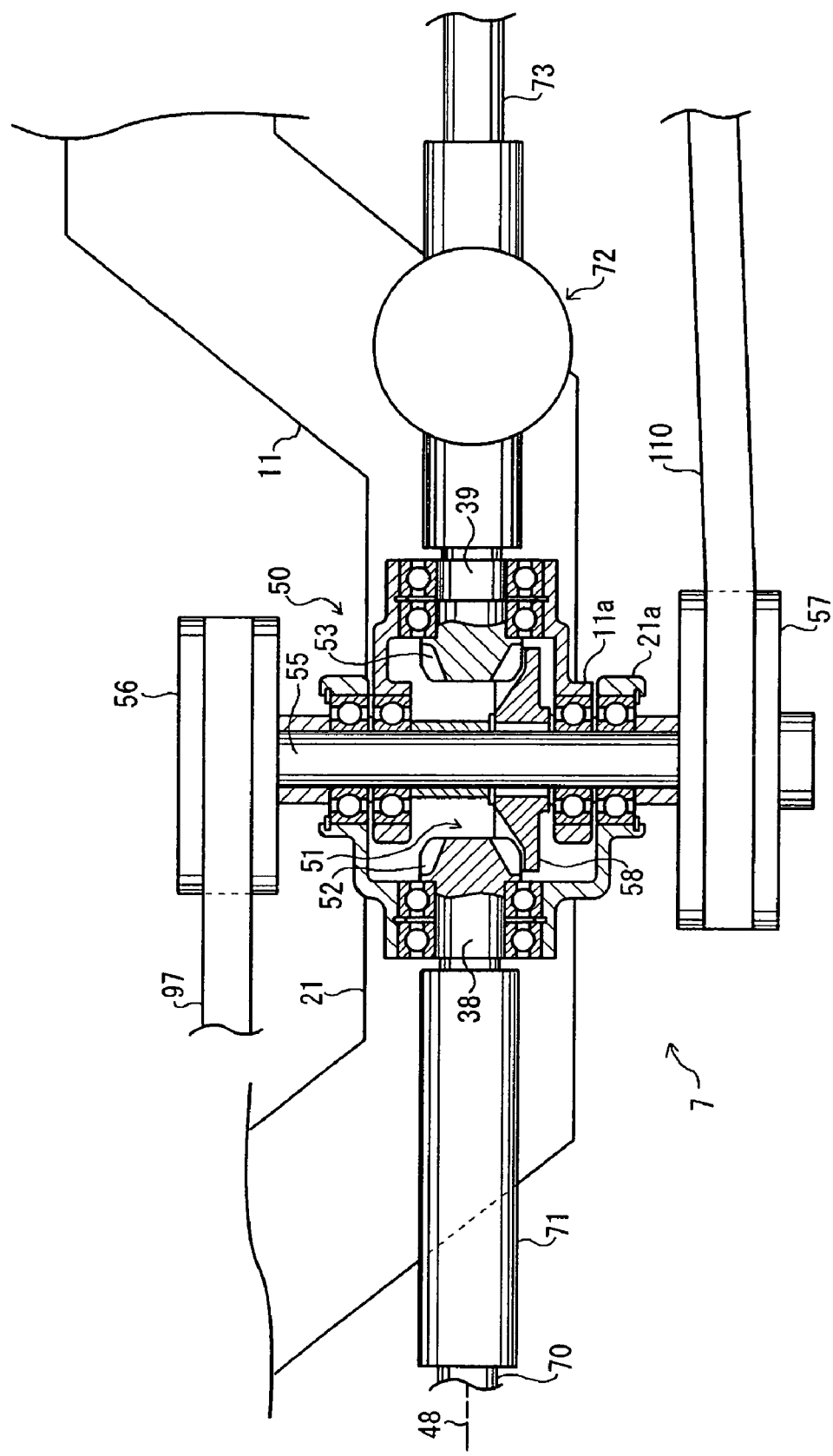
FIG. 4 is a side view partly in section of a gearbox in a coupling part.

As shown in FIG. 4, in the coupling part 50, the front frame 11 and the rear frame 21 are mutually flexibly connected, and a coupling transmission shaft 55 is disposed having a vertical rotary axis pivotally connected to both the frames 11 and 21 so as to transmit power of the engine 5 to the mower device 3. The coupling transmission shaft 55 is fittingly provided on a top portion thereof with an input pulley 56 and on a bottom portion thereof with an output pulley 57.

As shown in FIG. 2, a rear transmission belt 97 is looped among the HST input pulley 92, the engine output pulley 94, the idle roller 96 and the input pulley 56 so as to transmit the power of the engine 5 through the HST input pulley 92 to the hydraulic pump in the first transaxle apparatus 20.

In this way, the vehicle is provided with the engine 5 mounted on the rear frame 21, and with the mower device 3 serving as a working device which is attached to the distal end of the front frame 11, while the rear frame 21, which serves as the first frame supporting the first transaxle apparatus 20 including the rear wheel axles 22L and 22R serving as the pair of first axles, and the front frame 11, which serves as the second frame supporting the second transaxle apparatus 10 including the front wheel axles 12L and 12R serving as the pair of second axles, are connected at their respective proximal ends to each other through the coupling part 50 so as to be rotatable around the vertical axis of the coupling transmission shaft 55 according to steering operation (operation of the steering wheel 4).

Description will now be given of a structure of the first transaxle apparatus 20. As shown in FIG. 6, the first transaxle apparatus 20 comprises a pump shaft 31, an HST and a power take-off shaft 70 (see FIG. 5). The pump shaft 31 serves as a first input shaft which receives power from the engine 5. The HST transmits the rotation of the pump shaft 31 variably to the pair of rear wheel axles 22L and 22R. The power take-off shaft 70 takes out rotation synchronized with the rear wheel axles 22L and 22R connected drivingly to horizontal shafts (shaft portions 38 and 39 in FIG. 4) provided in the coupling part 50.

Figure 5:
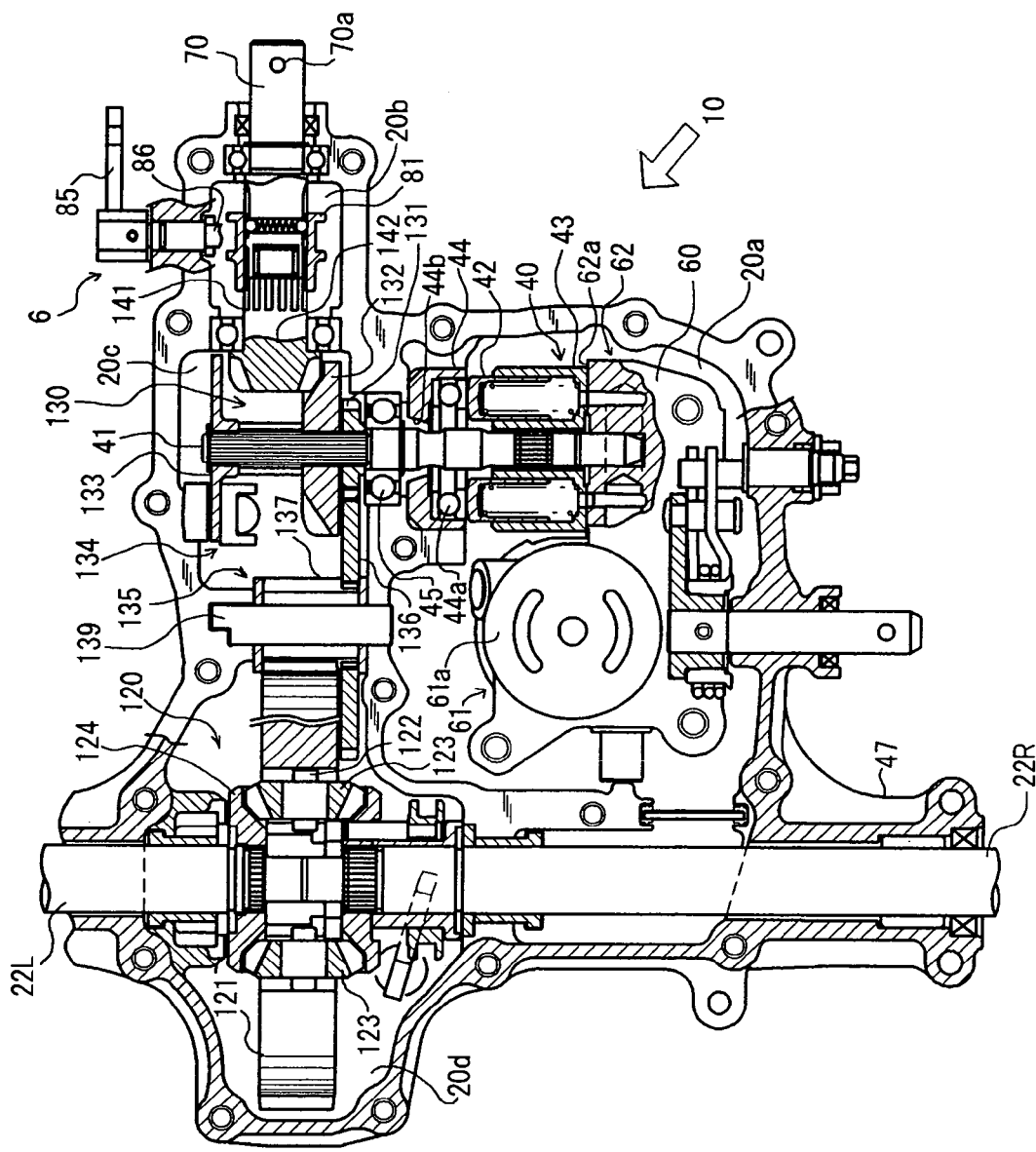
FIG. 5 is a plan view partly in section of an internal structure of a first transaxle apparatus.
Figure 6:
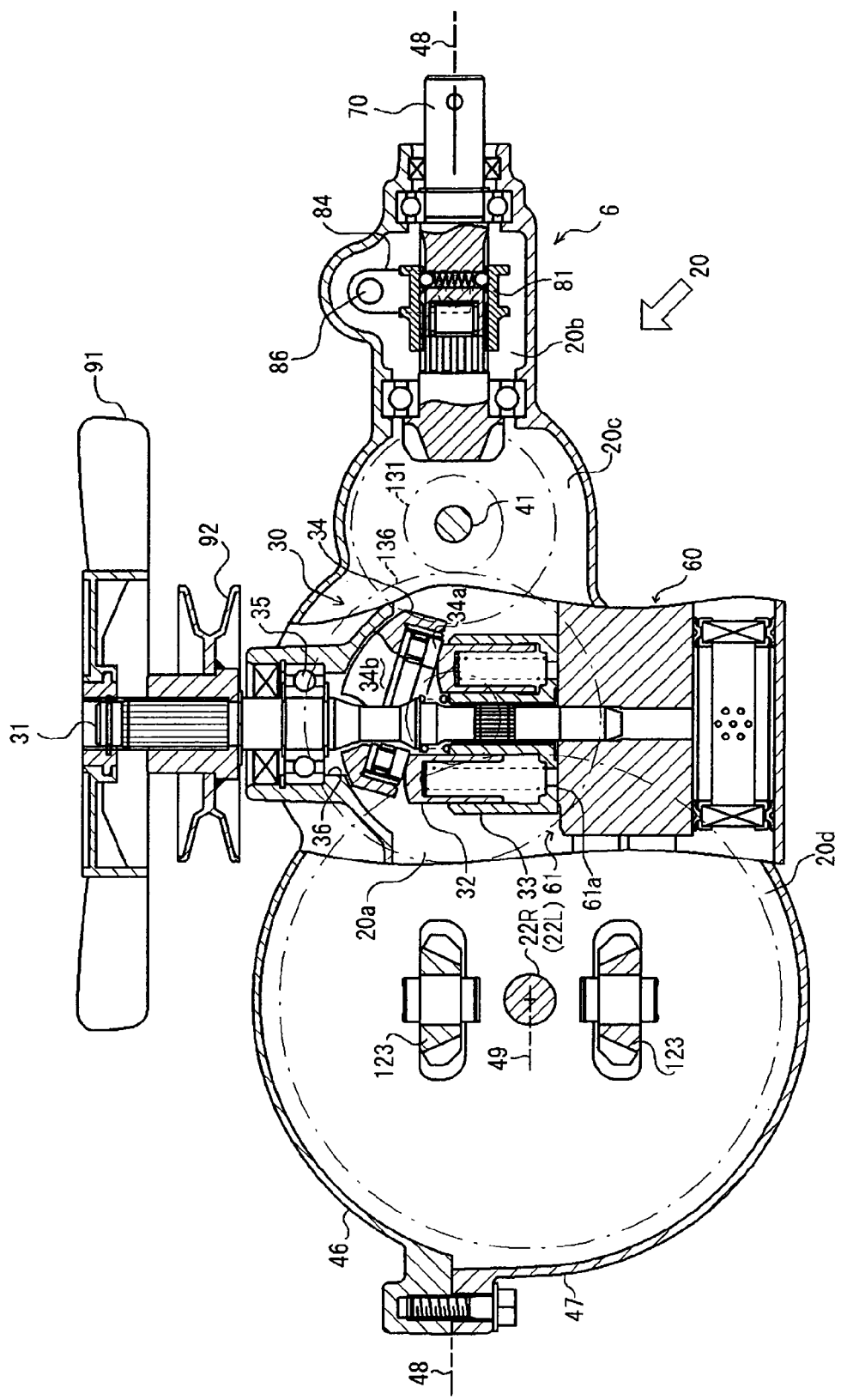
FIG. 6 is a side view partly in section of the same.

As shown in FIGS. 5 and 6, an upper housing half 46 and a lower housing half 47 constitute a housing serving as a semblance of the first transaxle apparatus 20. The interior of the housing is formed into a first chamber 20a, a second chamber 20b, a third chamber 20c and a fourth chamber 20d. In the first chamber 20a substantially centered in the housing is disposed, among other things, the HST comprising a hydraulic pump 30, a hydraulic motor 40 and a center section 60. At a left side of the first chamber 20a are aligned the second chamber 20b, the third chamber 20c and the fourth chamber 20d from front to rear. In the second chamber 20b is disposed the power take-off part 6. In the third chamber 20c is disposed a drive power output gear unit 130 which transmits driving force of the hydraulic motor 40 to both the power take-off part 6 and a rear differential gear unit 120 behind the power take-off part 6. In the fourth chamber 20d is disposed the rear differential gear unit 120 which transmits the driving force to the rear wheel axles 22L and 22R.

As shown in FIG. 6, the hydraulic pump 30 of the HST disposed in the first chamber 20a is provided with a cylinder block 33 rotatably slidably fitted on a pump mounting surface 61a formed on a horizontal portion 61 of the center section 60. Pistons 32 are reciprocally movably fitted through respective biasing springs into a plurality of cylinder bores in the cylinder block 33. A thrust bearing 34a of a movable swash plate 34 abuts against heads of the pistons 32. An opening 34b is provided at the center of the movable swash plate 34 so as to allow the pump shaft 31 to perforate therethrough.

In order that the pump shaft 31 may function as an input shaft, the pump shaft 31 is rotatably supported by a sealed bearing 35 fitted in an opening 36 formed in the upper housing half 46 above the first chamber 20a and is not-relatively rotatably engaged with the cylinder block 33, thereby being disposed vertically on the rotary axis of the cylinder block 33.

Thus, the hydraulic pump 30 is made as an axial piston type variable displacement hydraulic pump.

The pump shaft 31 projects outwardly at the upper end thereof from a top surface of the first transaxle apparatus 20. A cooling fan 91 and the HST input pulley 92 under the cooling fan 91 are fitted on the upper projecting portion of the pump shaft 31. Engine power is inputted into the HST input pulley 92 through the transmission means so as to rotate the pump shaft 31.

As shown in FIG. 5, the hydraulic motor 40 is provided with a cylinder block 43 rotatably slidably fitted on a motor mounting surface 62a formed on a vertical portion 62 of the center section 60. Pistons 42 are reciprocally movably fitted through respective biasing springs into a plurality of cylinder bores in the cylinder block 43. A thrust bearing 44a of a fixed swash plate 44 abuts against heads of the pistons 42. The fixed swash plate 44 is fixedly sandwiched between the upper and lower housing halves 46 and 47. An opening 44b is provided at the center of the fixed swash plate 44 so as to allow a motor shaft 41 to perforate therethrough.

In order that the motor shaft 41 may function as an output shaft, the motor shaft 41 is rotatably supported by a sealed bearing 45 held in a partition wall formed of the upper and lower housing halves 46 and 47 between the first and third chambers 20a and 20c and is not-relatively rotatably engaged with the cylinder block 43, thereby being disposed horizontally on the rotary axis of the cylinder block 43.

Thus, the hydraulic motor 40 is made as an axial piston type fixed displacement hydraulic motor.

The center section 60 fluidly connects the cylinder bores of the cylinder block 33 of the hydraulic pump 30 to the cylinder bores of the cylinder block 43 of the hydraulic motor 40. Then, the cylinder block 33 pumps hydraulic fluid so as to rotate the cylinder block 43 and the motor shaft 41.

The motor shaft 41 of the hydraulic motor 40 is extended at a left end thereof into the third chamber 20c. In the third chamber 20c are aligned from right to left a rear-wheel-driving power output gear 131, a front-wheel-driving power output gear 132, and a brake rotor 133 so as to constitute the drive power output gear unit 130. The brake rotor 133 is pressed between brake pads 134 so as to exert a braking action.

As to the drive power output gear unit 130, an intermediate gearing 135 including a larger spur gear 136 and a smaller spur gear 137 is rotatably fitted on a counter shaft 139 behind the rear-wheel-driving power output gear 131. The rear-wheel-driving power output gear 131 meshes with the larger gear 136 of the intermediate gearing 135. When the larger gear 136 rotates, the smaller gear 137 also rotates so as to transmit the driving force of the motor shaft 41 to the rear differential gear unit 120.

On the other hand, in the drive power output gear unit 130, the front-wheel-driving power output gear 132 is a bevel gear and is inserted at a front portion thereof into the second chamber 20b so as to mesh with a bevel input gear 142 formed on a rear end portion of an input shaft 141, thereby transmitting the driving force of the motor shaft 41 to the power take-off part 6.

Figure 7:
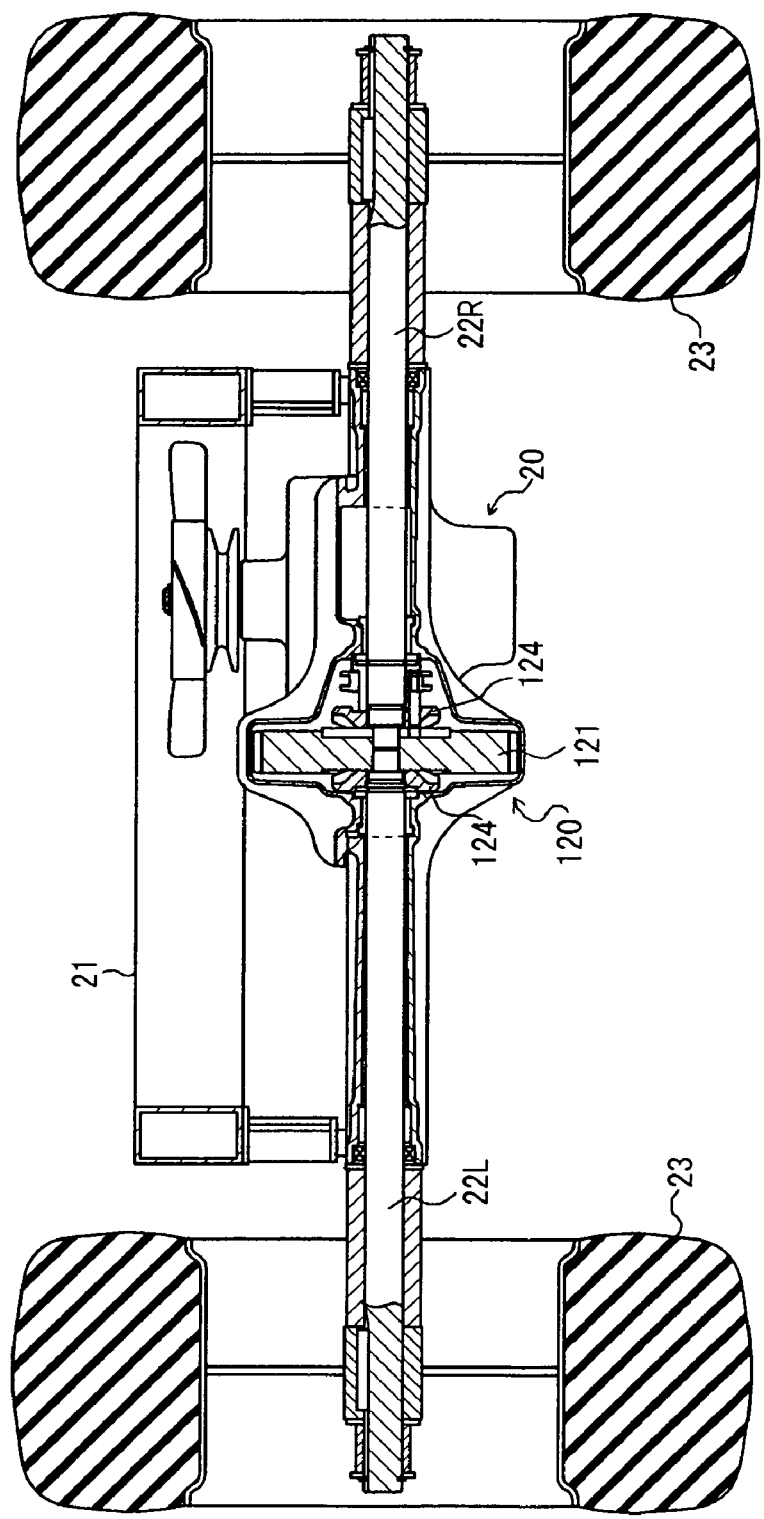
FIG. 7 is a rear view partly in section of a vehicle structure near the first transaxle apparatus.

As shown in FIGS. 5 to 7, the rear differential gear unit 120 comprises, among other things, a ring gear 121, a pair of pinion shafts 122, a pair of pinions 123, and a pair of side gears 124. The ring gear 121 meshes at an outer periphery thereof with the smaller gear 137 of the intermediate gearing 135. The pinions 123 project inward from an inner periphery of the ring gear 121. The pinions 123 are rotatably supported on the respective pinion shafts 122. The side gears 124 are fitted on the respective rear wheel axles 22L and 22R. Each of the pinions 123 meshes at left and right sides thereof with the side gears 124. The rear differential gear unit 120 transmits driving force of the motor shaft 41 to the rear wheel axles 22L and 22R from the intermediate gearing 135 through the ring gear 121, the pinions 123 and the side gears 124. Thus, the rear differential gear unit 120 and the drive power output gear unit 130 constitute a drive train.

Figure 8:
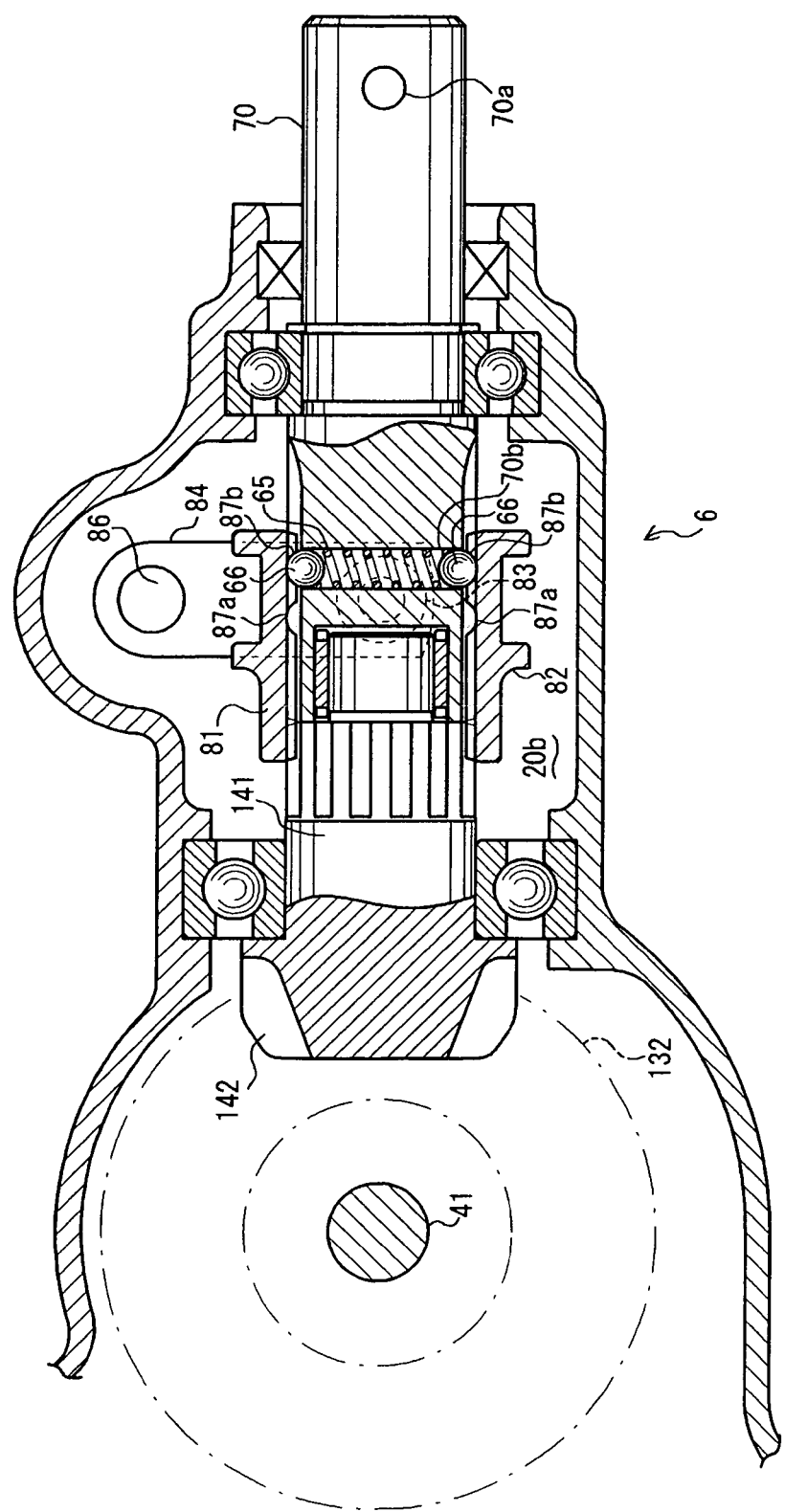
FIG. 8 is a side view partly in section of a structure of a power take-off portion.

As shown in FIG. 8, the power take-off part 6 is arranged in the second chamber 20b.

As a structure of the power take-off part 6, the input shaft 141 is provided on a rear portion thereof with an input gear 142 which meshes with the front-wheel-driving power output gear 132. A front portion of the power take-off shaft 70 is bored by a pin hole 70a and projects forward from the second transaxle apparatus 20. A clutch slider 81 is spline-fitted forwardly and backwardly slidably on a front portion of the input shaft 141 and a rear portion of the power take-off shaft 70, thereby interlockingly connecting the input shaft 141 to the power take-off shaft 70.

The input shaft 141 and the power take-off shaft 70 share a common rotary axis perpendicular to the rotary axis of the motor shaft 41 of the hydraulic motor 40. An annular engagement groove 82 is formed on the clutch slider 81. A shifter fork 84 is provided at a lower portion thereof with an engaging barrel 83 which is fitted at an inner peripheral surface thereof with the engaging groove 82. The sifter fork 84 is fitted on a rotary shaft 86 of a control arm 85 (see FIG. 5) interlocking with an operation lever (not shown) so that the clutch slider 81 moves forward and backward according to motion of the operation lever. The clutch slider 81 is slid forward so as to separate the clutch slider 81 from the input shaft 141, thereby clutching off.

The clutch slider 81 is recessed from an inner peripheral surface thereof with a pair of opposite hemispherical engaging holes 87a and a pair of opposite hemispherical engaging holes 87b. The hemispherical engaging holes 87b are bored in front of the hemispherical engaging holes 87a. On the other hand, the power take-off shaft 70 is bored out by a penetration hole 70b perpendicularly to the axis thereof. In the penetration hole 70b, a spring 65 is inserted and balls 66 are disposed on both opposite ends of the spring 65. For clutching off, the balls 66 are engaged into the respective rear engaging holes 87a of the clutch slider 81, and the biasing force of the spring 65 is applied for maintaining the clutch-off state. For clutching on, the balls 66 are engaged into the respective front engaging holes 87b of the clutch slider 81, and the biasing force of the spring 65 is applied for maintaining the clutch-on state.

As shown in FIG. 6, the housing of the first transaxle apparatus 20 forming the chambers 20a, 20b, 20c and 20d therein is separable upward and downward through a first level surface 48 on which the axis of the power take-off shaft 70 lies. Namely, the upper and lower housing halves 46 and 47 are faced at their open surfaces to each other and joined to each other so as to make a single housing serving as a semblance of the first transaxle apparatus 20.

For an assembly procedure of the first transaxle apparatus 20, such assemblies as the hydraulic pump 30, the hydraulic motor 40 and the power take-off part 6, which are previously assembled up, respectively, are assembled into the lower housing half 47, and then the upper housing half 46 is fixed to the lower housing half 47 so as to cover the assemblies. Therefore, the first transaxle apparatus 20 can be assembled simply in a short time.

As shown in FIG. 6, in the first transaxle apparatus 20, a second level surface 49 serves as a surface on which the axis of the rear wheel axles 22L and 22R lies, while the first level surface 48 serves as the surface on which the axis of the power take-off shaft 70 lies. The first level surface 48 is positioned higher than the second level surface 49.

Due to this constitution, the power take-off shaft 70 is arranged higher than the rear wheel axles 22L and 22R so that, as mentioned later, a road clearance is not made small by the power take-off shaft 70 and the axle-driving power transmission system 7 connected to the power take-off shaft 70 in series.

Figure 9:
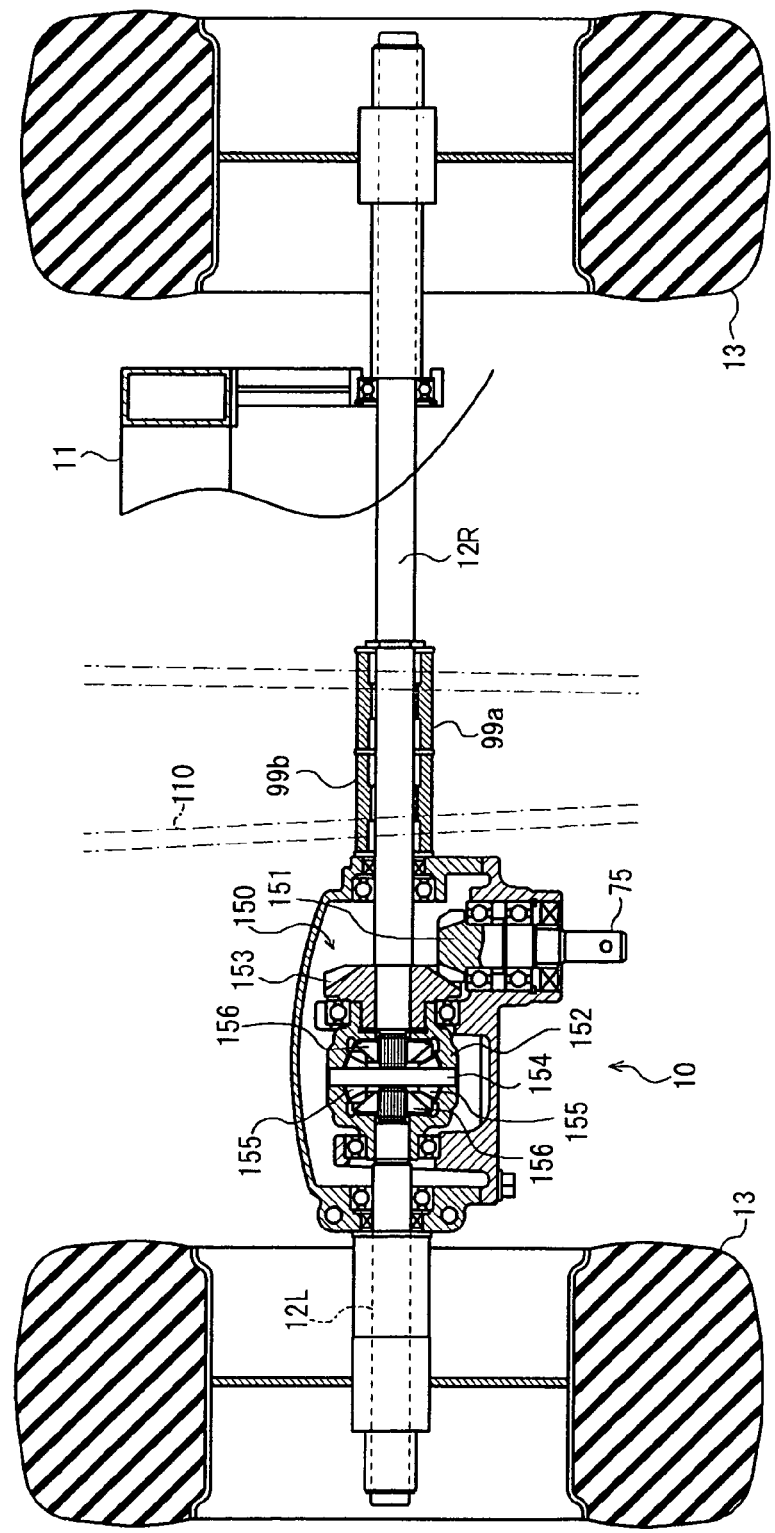
FIG. 9 is a plan view partly in section of a vehicle structure near a second transaxle apparatus.

Description will now be given of the composition of the first transaxle apparatus 10. As shown in FIG. 9, a front differential gear unit 150 is incorporated in the second transaxle apparatus 10. An input shaft 75 serving as a second input shaft projects at a rear portion thereof backward from a rear portion of the second transaxle apparatus 10. On the other hand, an axial shaft of an input gear 151 is fitted into a front end of the input shaft 75. Therefore, the driving force taken out from the power take-off part 6 is input into the input shaft 75 so as to rotate the input gear 151.

A rotary axis of the input shaft 75 of the second transaxle apparatus 10 is as high as the rotary axis of the power take-off shaft 70 of the first transaxle apparatus 20, i.e., the first level surface 48.

In the second transaxle apparatus 10 is rotatably supported a differential gear casing 152. A ring gear 153 is attached onto a right portion of the differential gear casing 152, and meshes with the input gear 151. A rotary axis of the differential gear casing 152 and the ring gear 153 is perpendicular to the input gear 151, and in agreement with the axis of the front wheel axles 12L and 12R.

A pinion shaft 154 is fixed to the inside of the differential gear case 152, and a pair of pinions 155 are rotatably supported on the pinion shaft 154. A pair of side gears 156 are fitted on the respective front wheel axle 12L and 12R and mesh with each of the pinions 155.

Due to this constitution, the driving force of the motor shaft 75 is transmitted to the front wheel axles 12L and 12R through the input gear 151, the ring gear 153, the differential gear casing 152, the pinion shaft 154, the pinions 155, and the side gears 156.

As shown in FIG. 2, the second transaxle apparatus 10 is arranged laterally eccentrically so as to make one of the front wheel axles 12L and 12R longer than the other. A working device driving transmission belt 110 for drivingly connecting a rotor including the coupling transmission shaft 55 to the mower device 3 passes under the longer front wheel axle 12R transversely.

Such eccentric arrangement of the second transaxle apparatus 10 increases an allowed height of the transmission belt 110 from the ground and ensures a large height of the output pulley 57 for driving the transmission belt 110 from the ground, thereby improving the running performance of the vehicle on a rugged ground, i.e., enlarging a road clearance of the vehicle.

Description will now be given of axle driving power transmission system 7 for transmitting power from the first transaxle apparatus 20 to the second transaxle apparatus 10.

Figure 3:
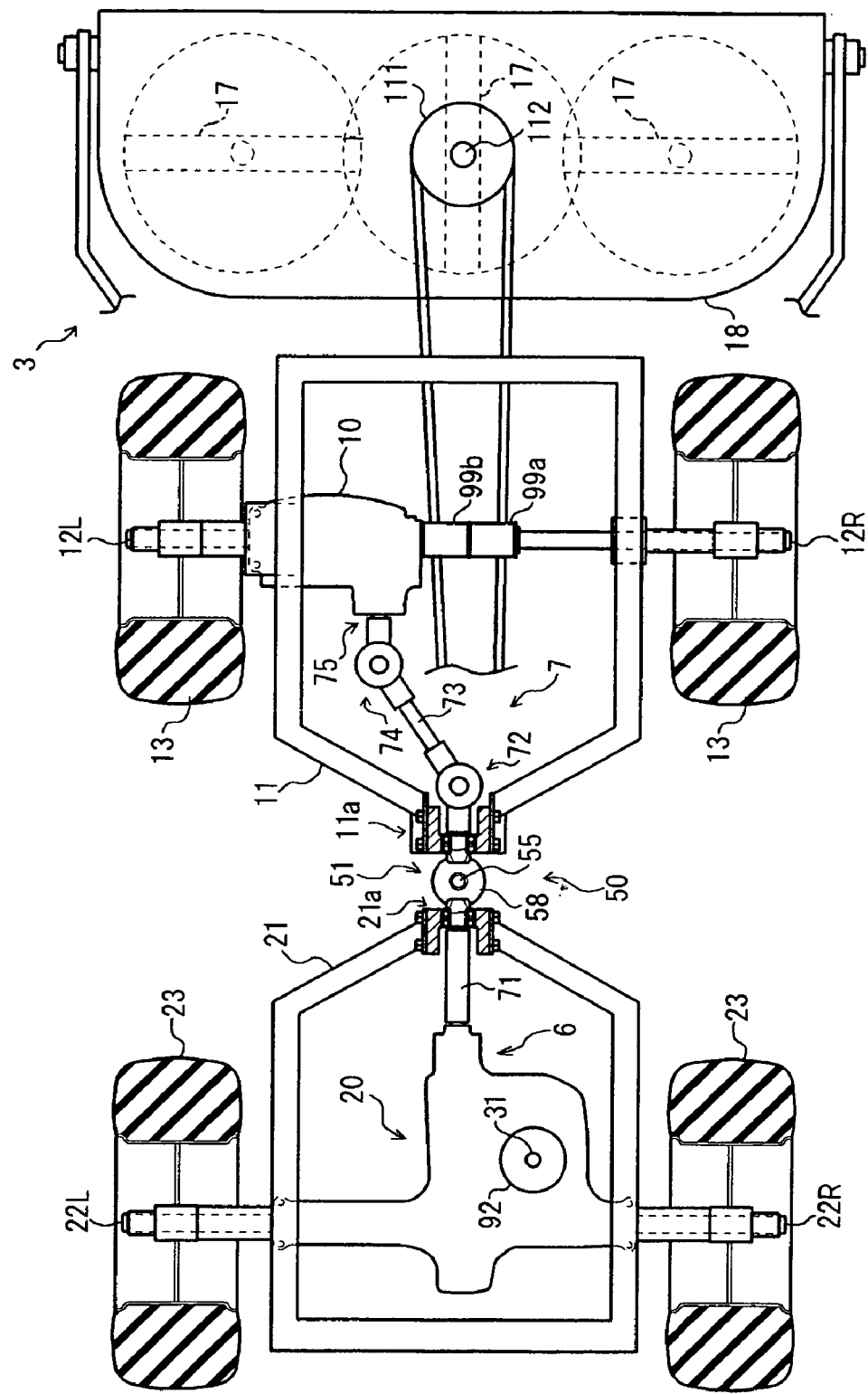
FIG. 3 is a plan view of a structure of power transmission means for driving axles in the lawn mower.

As shown in FIGS. 3 and 4, the axle driving power transmission system 7 comprises a transmission device 51 provided in the coupling part 50, a rear propeller shaft 71, a first universal joint 72, a front propeller shaft 73, and a second universal joint 74, and interlockingly connects the power take-off shaft 70 of the power take-off part 6 provided in the first transaxle apparatus 20 to the input shaft 75 (FIG. 3) provided in the first transaxle apparatus 10.

In more detail, the coupling part 50 comprises a substantially C-like shaped (in a sectional side view) flange 21*a*, a similarly substantially C-like shaped (in a sectional side view) flange 11*a*, and the coupling transmission shaft 55. The flange 21*a* is formed at a front portion of the rear frame 21. The flange 11*a* is inserted into the flange 21*a*. The coupling transmission shaft 55 is vertically disposed through bearings of the respective flanges 21*a* and 11*a*. Due to this constitution, both the front frame 11 and the rear frame 21 are connected so as to be rotatable around the vertical axis of the coupling transmission shaft 55 according to steering operation.

As shown in FIG. 4, the transmission device 51 comprises a transmission gear 58, a rear transmission gear 52, and a front transmission gear 53. The transmission gear 58 is freely rotatably fitted on the coupling transmission shaft 55 in the flange 21*a*. The rear transmission gear 52 is pivotally supported by the flange 21*a* of the rear frame 21 and meshes with the transmission gear 58 perpendicularly. The front transmission gear 53 is pivotally supported by the flange 11*a* of the front frame 11 and meshes with the transmission gear 58 perpendicularly. Therefore, driving force inputted into a shaft 38 of the rear transmission gear 52 is transmitted to the front transmission gear 53 through the transmission gear 58, and is outputted from a shaft 39 of the front transmission gear 53. Consequently, the coupling part 50 constitutes a gearbox including a pair of horizontal shafts of the rear and front transmission gears 52 and 53 which are variable in their relative angles around the vertical axis of the coupling transmission shaft 55 while they are drivingly connected to each other.

A rotary axis of the shaft 39 of the front transmission gear 53 is set as high as that of the shaft 38 of the rear transmission gear 52, thereby being as high as the first level surface 48 including the axis of the power take-off shaft 70.

Furthermore, while the power take-off shaft 70 and the rear transmission gear 52 are interlockingly connected with each other through the rear propeller shaft 71, the front transmission gear 53 and the input shaft 75 are interlockingly connected with each other through the first universal joint 72, the front propeller shaft 73, and the second universal joint 74, thereby constituting a series of the axle driving power transmission system 7 for inputting power taken out from the power take-off shaft 70 into the second transaxle apparatus 10.

Such axle driving power transmission system 7 realizes a four-wheel drive articulate vehicle driving all the front wheels 13 and rear wheels 23, which is superior in its steering performance and also in its running performance on a damp ground.

Instead of the described articulate vehicle, an Ackerman type four-wheel drive vehicle may be equipped at front and rear portions thereof with the first transaxle apparatus 20 and the second transaxle apparatus 10, respectively. In this case, for constituting the axle driving power transmission system 7 which synchronizes the axles of the first and second transaxle apparatuses 20 and 10, it is generally necessary to make a rotary speed difference between the rear and front wheels while the vehicle turns left or right. A device for absorbing the rotary speed difference, such as a center differential gear unit or a one-way clutch, may be provided in the axle driving power transmission system 7 so as to fulfill the necessity.

Regarding the shafts constituting a train of the axle driving power transmission system 7 as mentioned above, the rotary axes of the power take-off shaft 70 of the second transaxle apparatus 20, the shaft 38 of the rear transmission gear 52, the shaft 39 of the front transmission gear 53, and the input shaft 75 of the first transaxle apparatus 10 are as high as the first level surface 48. Also, the rotary axes of the rear propeller shaft 71 and the front propeller shaft 73 are as high as the first level surface 48.

Due to this structure, the axle driving power transmission system 7 is positioned at the height of the first level surface 48 so as not to reduce a road clearance of the vehicle.

Description will now be given of a working device driving power transmission system for transmitting power from the engine 5 to a working device such as the mower device 3.

As shown in FIG. 4, in the coupling part 50 is supported the coupling transmission shaft 55 penetrating the flanges 11*a* and 21*a* of the front and rear frames. The coupling transmission shaft 55 is fixedly provided on the upper portion thereof with the input pulley 56 and on the lower portion thereof with the output pulley 57 so that the driving force inputted into the input pulley 56 from the rear drive transmission belt 97 is outputted to the output pulley 57 through the coupling transmission shaft 55. In this way, the coupling transmission shaft 55, the input pulley 56, and the output pulley 57 constitute a rotor having the vertical axis disposed on the rotary axis of the coupling transmission shaft 55, which outputs power from the engine 5 to the mower device 3 serving as a working device.

As shown in FIGS. 1 and 2, the mower device 3 comprises a casing 18 incorporating mowing blades 17. A transmission box 19 is provided on an upper portion of the casing 18 so as to drive the blades 17. An input shaft 112 projects upward from a substantially laterally middle portion of the transmission box 19 and is fittingly provided on a top portion thereof with a working device driving power input pulley 111.

The power output pulley 57 and the working device driving power input pulley 111 are tied together by a transmission belt 110, so that the driving force of the engine 5 inputted into the coupling transmission shaft 55 is transmitted to the working device driving power input pulley 111 through the transmission belt 110 from the output pulley 57, thereby rotating the mowing blades 17.

The height of the mower device 3 can be changed by a lift device (not shown). If the transmission belt 110 comes in contact with the front wheel axle 12R by raising the mower device 3 and the vehicle travels, such a problem arises that a friction is generated between the belt 110 and the axle 12R so as to damage the belt 110.

In order to solve the problem, a pair of right and left collars 99*a* and 99*b* are freely rotatably supported on the front wheel axle 12R above the transmission belt 110. Referring to FIG. 2, an upper portion of the belt 110 which moves in a direction 26 is allowed to contact the collar 99*a*, and another upper portion of the belt 110 which moves in a direction 26 is allowed to contact the collar 99*b*. Thus, the collars 99*a* and 99*b* are rotated oppositely to each other and freely relative to the axle 12R so as not to generate a friction with the belt 110, thereby preventing the belt 110 from being damaged.

The present invention constructed as described above has the following effects. An articulate working vehicle can drive four wheels, thereby improving its steering and running performance.

The first level surface, on which the rotary axis of the power take-off shaft serving as a power take-off part of the power transmission system lies, is set higher than the second position, on which the rotary axes of the axles lie, thereby giving a large road clearance to the vehicle.

The housing of the transaxle apparatus equipped with power transmission means is separable into two housing components bordering on the first level surface, thereby facilitating easy assembly of the transaxle apparatus.

The conventional power transmission system for a working device is secured so as not to reduce the road clearance of the vehicle.

What is claimed is:

1. An articulated vehicle, comprising:
   first and second frames;
   a coupling pivot for articulately coupling the first and second frames to each other;
   a prime mover mounted on the first frame;
   a first transaxle mounted on the first frame and drivingly connected to the prime mover, the first transaxle having an output shaft;
   a second transaxle mounted on the second frame, the second transaxle having an input shaft;
   a working machine supported by one of the first and second frames;
   a first relay point disposed on the coupling pivot so as to drivingly connect the output shaft of the first transaxle to the input shaft of the second transaxle; and
   a second relay point disposed on the coupling pivot so as to drivingly connect the working machine to the prime mover.

2. The articulated vehicle as set forth in claim 1, the second frame having opposite first and second sides, further comprising:
   first and second axles supported and driven by the second transaxle, wherein the second transaxle is eccentrically disposed toward the first side of the second frame so that the second axle disposed toward the second side becomes longer than the first axle disposed toward the first side; and
   a power-transmitting member extended from the second relay point to the working machine across the second axle.

* * * * *